United States Patent
Lee et al.

(10) Patent No.: US 8,781,252 B2
(45) Date of Patent: Jul. 15, 2014

(54) IMAGE PROCESSING APPARATUS AND METHOD

(75) Inventors: Seok Lee, Yongin-si (KR); Jae Joon Lee, Seoul (KR); Ho Cheon Wey, Seongnam-si (KR); Seung Sin Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 444 days.

(21) Appl. No.: 13/064,921

(22) Filed: Apr. 26, 2011

(65) Prior Publication Data

US 2012/0039528 A1 Feb. 16, 2012

(30) Foreign Application Priority Data

Aug. 16, 2010 (KR) ................. 10-2010-0078802

(51) Int. Cl.
| | | |
|---|---|---|
| *G06K 9/36* | (2006.01) | |
| *G06K 9/00* | (2006.01) | |
| *G06K 9/46* | (2006.01) | |
| *G06T 9/00* | (2006.01) | |
| *H04N 13/00* | (2006.01) | |
| *H04N 7/32* | (2006.01) | |

(52) U.S. Cl.
CPC ............ *H04N 19/00769* (2013.01); *G06T 9/00* (2013.01); *H04N 13/0048* (2013.01); *H04N 13/00* (2013.01); *H04N 13/0007* (2013.01)
USPC ............ 382/276; 382/154; 382/232; 382/285

(58) Field of Classification Search
CPC ...... H04N 7/50; G06T 7/0065; G06T 7/0075; G06T 11/00; G06T 11/60; G06T 19/00
USPC ................... 345/419; 382/162, 232, 276, 285
See application file for complete search history.

(56) References Cited

U.S. PATENT DOCUMENTS

| | | | | |
|---|---|---|---|---|
| 5,953,076 | A * | 9/1999 | Astle et al. ................. | 348/584 |
| 7,085,409 | B2 * | 8/2006 | Sawhney et al. ............ | 382/154 |
| 8,345,751 | B2 * | 1/2013 | Klein et al. ............. | 375/240.08 |
| 2010/0142824 | A1 * | 6/2010 | Lu ................................ | 382/195 |
| 2011/0149037 | A1 * | 6/2011 | Van Der Horst et al. ....... | 348/43 |
| 2011/0211043 | A1 * | 9/2011 | Benien et al. .................. | 348/43 |
| 2011/0234754 | A1 * | 9/2011 | Newton et al. ................. | 348/43 |

FOREIGN PATENT DOCUMENTS

| | | |
|---|---|---|
| JP | 2000-322576 | 11/2000 |
| JP | 2008-217243 | 9/2008 |
| JP | 2009-116532 | 5/2009 |
| KR | 10-2005-0102156 | 10/2005 |
| KR | 10-2009-0050783 | 5/2009 |
| KR | 10-2010-0019927 | 2/2010 |

* cited by examiner

*Primary Examiner* — Matthew Bella
*Assistant Examiner* — Jose M Torres
(74) *Attorney, Agent, or Firm* — Staas & Halsey LLP (57) ABSTRACT

Provided is an image processing apparatus. In the case of a multi-view image, the image processing apparatus may warp a color image and/or a depth image of a reference view to correspond to a target view. An occlusion region may be extracted by comparing the warped color image and/or depth image of the reference view with a color image and/or a depth image of the target view. The image processing apparatus may encode the extracted occlusion region information without loss, and decrease an amount of data in the multi-view image.

20 Claims, 9 Drawing Sheets

IMAGE PROCESSING APPARATUS AND METHOD

CROSS-REFERENCE TO RELATED APPLICATIONS

This application claims the priority benefit of Korean Patent Application No. 10-2010-0078802, filed on Aug. 16, 2010, in the Korean Intellectual Property Office, the disclosure of which is incorporated herein by reference.

BACKGROUND

1. Field

Example embodiments of the present disclosure relate to a method that may effectively store image information so that a three-dimensional (3D) video system may generate a plurality of view images with a relatively small amount of data, and more particularly, to an image processing apparatus and method that may obtain and store occlusion region information according to a difference between views.

2. Description of the Related Art

Interest in three-dimensional (3D) imaging is increasing. 3D images may be configured by providing a plurality of images corresponding to different viewpoints. For example, the 3D image may be a multi-view image corresponding to a plurality of views or a stereoscopic image providing a left eye image and a right eye image corresponding to two different views.

In the case of the multi-view image, a color image corresponding to each view may need to be provided. However, to substantially acquire and encode total color images of each view, an amount of data to be stored and be transmitted may be great.

Accordingly, when a color image is appropriately generated by substantially acquiring and storing color images and depth images with respect to a first portion of color images of views associated with the stereoscopic image or the multi-view image, and by using the substantially acquired and stored view images with respect to another portion of the color images of the views, it is possible to significantly decrease an amount of data to be transmitted and be stored.

There is a desire for an image processing method that may appropriately acquire and store occlusion region information dis-occluded by warping occurring due to a view difference.

SUMMARY

The foregoing and/or other aspects are achieved by providing an image processing apparatus, including an extraction unit to extract an occlusion region of a color image of a reference view using a difference between a warped color image of the reference view corresponding to a target view and a color image of the target view, a backward warping unit to backward warp the occlusion region of the color image of the reference view to correspond to the reference view, and a processing unit to generate an occlusion region image to be stored by applying a side offset to the backward warped occlusion region of the color image of the reference view.

The processing unit may duplicate a color value from a corresponding pixel of the color image of the reference view with respect to a pixel where a color value within the occlusion region image is absent.

The processing unit may perform post-processing with respect to the occlusion region image, and the post-processing may include hole filling.

The image processing apparatus may further include a warping unit to warp the color image of the reference view to correspond to the target view, using at least one of a depth image of the reference view and a depth image of the target view.

The image processing apparatus may further include an encoding unit to encode the occlusion region image in association with the color image of the reference view.

The foregoing and/or other aspects are achieved by providing an image processing apparatus, including an extraction unit to extract an occlusion region of a depth image of a reference view using a difference between a warped depth image of the reference view corresponding to a target view and a depth image of the target view, a backward warping unit to backward warp the occlusion region of the depth image of the reference view to correspond to the reference view, and a processing unit to generate an occlusion region image to be stored by applying a side offset to the backward warped occlusion region of the depth image of the reference view.

The foregoing and/or other aspects are achieved by providing an image processing method, including extracting an occlusion region of a color image of a reference view using a difference between a warped color image of the reference view corresponding to a target view and a color image of the target view, backward warping the occlusion region of the color image of the reference view to correspond to the reference view, and generating an occlusion region image to be stored by applying a side offset to the backward warped occlusion region of the color image of the reference view.

The foregoing and/or other aspects are achieved by providing an image processing method, including extracting an occlusion region of a depth image of a reference view using a difference between a warped depth image of the reference view corresponding to a target view and a depth image of the target view, backward warping the occlusion region of the depth image of the reference view to correspond to the reference view, and generating an occlusion region image to be stored by applying a side offset to the backward warped occlusion region of the depth image of the reference view.

The foregoing and/or other aspects are achieved by providing an image processing method that includes extracting occlusion region information of a color image of a reference view using a difference between a color image of a target view and a warped color image of the reference view corresponding to the target view, and encoding, by way of a processor, data including the extracted occlusion region information and the color image of the reference view.

The foregoing and/or other aspects are achieved by providing an image processing apparatus including a processor to control one or more processor-executable units, an extracting unit to extract occlusion region information of a color image of a reference view using a difference between a color image of a target view and a warped color image of the reference view corresponding to the target view, and an encoding unit to encode data including the extracted occlusion region information and the color image of the reference view.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
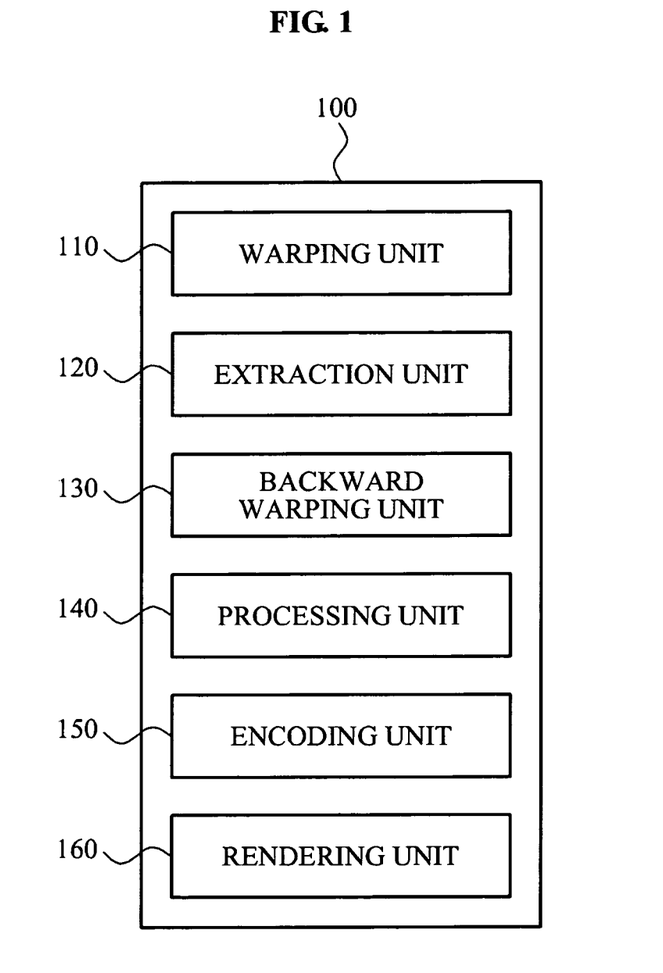
FIG. 1 illustrates an image processing apparatus according to example embodiments.

FIG. 1 illustrates an image processing apparatus 100 according to one or more example embodiments.

Referring to FIG. 1, the image processing apparatus 100 may include, for example, a warping unit 110, an extraction unit 120, a backward warping unit 130, a processing unit 140, an encoding unit 150, and a rendering unit 160.

The warping unit 110 may warp an input reference view image to correspond to a target view image. The image warping process of the warping unit 110 will be further described with reference to FIG. 2 and FIG. 3.

The extraction unit 120 may extract an occlusion region using a color value difference and/or a depth value difference between a warped image and the target view image. The occlusion region corresponds to a region where a color value disclosed during the image warping process is absent. A process of extracting the occlusion region and a result thereof will be further described with reference to FIG. 4.

The backward warping unit 130 may backward warp the extracted occlusion region to correspond to the reference view image. A backward warping process and a result thereof will be further described with reference to FIG. 5.

The processing unit 140 may generate an occlusion region image by applying a side offset to the backward warped occlusion region, by duplicating a pixel value from the reference view image with respect to a portion where the pixel value is absent, and by performing various post-processing.

The processing unit 140 may apply the side offset to an appropriate direction so that information of an occlusion region portion present outside a location of the reference view image in the occlusion region may not be lost. The side offset may be applied through, for example, a coordinate movement.

The processing unit 140 may duplicate a pixel value from an original reference view image with respect to a region where the pixel value is absent, excluding the occlusion region. With respect to a hole occurring due to image noise or other processing errors regardless of the above process, the processing unit 140 may generate and correct an occlusion region image by performing post-processing including hole filling or various filtering in operation 930 of FIG. 9.

An operation of the processing unit 140 will be further described with reference to FIG. 5 and FIG. 6.

The encoding unit 150 may encode the generated occlusion region image together with the reference view image. During the above process, the occlusion region image may be encoded in association with the reference view image and the encoding process will be further described with reference to FIG. 6 and FIG. 7.

The rendering unit 160 may render a color image of the target view using the color image of the reference view and the encoded occlusion region information.

Figure 2:
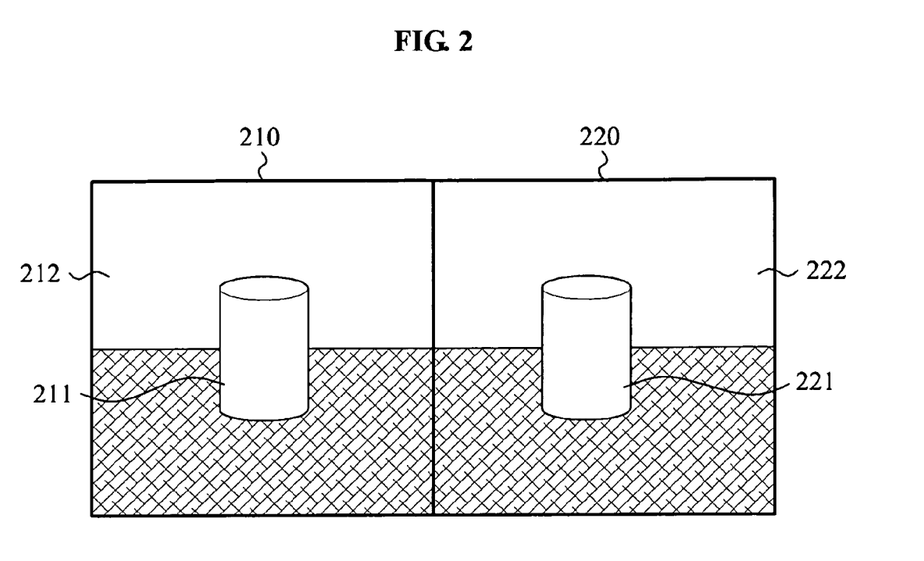
FIG. 2 illustrates a color image input into the image processing apparatus of FIG. 1 according to example embodiments.

FIG. 2 illustrates a color image input into the image processing apparatus 100 of FIG. 1 according to example embodiments.

A color image 210 of a target view and a color image 220 of a reference view that are input into the image processing apparatus 100 may correspond to different views constituting a stereoscopic image or a multi-view image.

For example, in the case of the stereoscopic image, the color image 210 of the target view may correspond to a left eye image and the color image 220 of the reference view may correspond to a right eye image. In the case of the multi-view image, the color image 210 of the target view may correspond to a view positioned to be further left than the color image 220 of the reference view.

The color image 210 of the target view may include a foreground region 211 and a background image 212. The foreground region 211 and the background image 212 may correspond to a foreground image 221 and a background image 222 within the color image 220 of the reference view.

Since a distance between the background region 212 and the target view, and a distance between the background region 222 and the reference view are each relatively far, disparity between the views may be relatively small. Since a distance between the foreground region 211 and the target view, and a distance between the foreground region 212 and the reference view are each relatively close, disparity between the views may be relatively great.

According to example embodiments, in a three-dimensional (3D) image or a 3D video using a stereoscopic scheme or a multi-view scheme, the color image 210 of the target view need not be encoded, thereby reducing an amount of data to be stored or transmitted. Eliminating the need to encode the color image 210 of the target view is accomplished by extracting occlusion region information between the color image 210 of the target view and the color image 220 of the reference view, and by encoding the extracted occlusion region information together with the color image 220 of the reference view.

When encoding is performed as above, the color image 210 of the target view may be rendered using the color image 220 of the reference view and the encoded occlusion region information. Since a color image corresponding to a virtual view positioned between the target view and the reference view is rendered, the multi-view image may be readily configured.

The occlusion region information encoded together with the color image 220 of the reference view may be processed. Accordingly, an occlusion region image may be understood as being composed of the occlusion region information.

In addition, a depth image of each view processed together for configuring of the 3D image or the 3D video may also be processed using the same scheme as processing of the color image. Accordingly, even though not particularly described, an image processing method with respect to a color image of each view may be similarly applicable to image processing of a depth image of each view.

The warping unit 110 may warp the color image 220 of the reference view to match the target view, that is, a view corresponding to the color image 210 of the target view.

Warping corresponds to predetermined image processing that may apply a transformation such as shifting using a disparity between views based on depth information of each region within the color image 220 of the reference view, and corresponds to image processing technology that may be understood by those skilled in the art. In addition to shifting, a variety of image processing schemes may be included in warping. Hereinafter, description will be made using only left or right warping for ease of description.

The warping unit 110 may also warp the color image 220 of the reference view to correspond to the target view according to a feature point comparison and the like, using a depth image (not shown) of the reference view and a depth image (not shown) of the target view.

Figure 3:
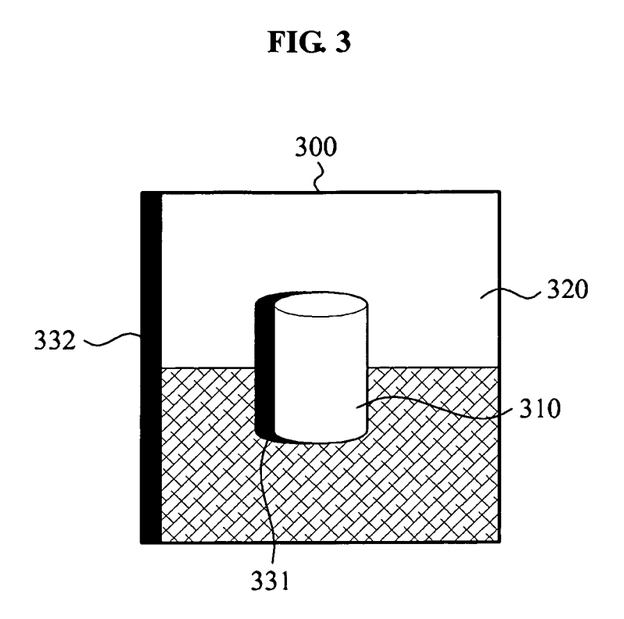
FIG. 3 illustrates a warped color image including an occlusion region dis-occluded by warping a color image of a reference view of FIG. 2 to correspond to a target view according to example embodiments.

A result of the warping unit 110 warping the color image 220 of the reference view to correspond to the target view is shown in FIG. 3.

FIG. 3 illustrates a warped color image 300 including an occlusion region that has become dis-occluded due to the warping the color image 220 of the reference view of FIG. 2 to correspond to the target view, according to example embodiments. In other words, the formerly occluded region is now no longer occluded due to the difference in view point.

A foreground region 310 of the warped color image 300 is provided at a location shifted to match the foreground region 221 within the color image 220 of the reference view of FIG. 2 with the target view. A background region 320 is also provided at a location shifted to match the background region 222 within the color image 220 of the reference view with the target view. Shifting of the foreground region 221 and the background region 222 may reflect a disparity based on a distance from the reference view, that is, depth information.

Occlusion regions 331 and 332, which were occluded in the color image 220 of the reference view, are dis-occluded in the warped color image 330. The occlusion regions 331 and 332 correspond to a portion where a background region portion occluded by the foreground region 221 becomes dis-occluded during the warping process and thus, color information is absent.

The extraction unit 120 of the image processing apparatus 100 may extract, from the color image 210 of the target view of FIG. 2, a color value of a portion corresponding to the occlusion regions 331 and 332.

The extraction unit 120 may calculate a corresponding location between views based on depth information of a reference view and a target view with respect to each pixel location of the color image 210 of the target view. When the difference between corresponding locations is less than or equal to a predetermined threshold, the extraction unit 120 may determine a corresponding region is not an occlusion region.

The extraction unit 120 may extract color information of the occlusion regions 331 and 332 by subtracting corresponding pixel values of the warped color image 300 from each pixel value of the color image 210 of the target view.

In a portion excluding the occlusion regions 331 and 332, pixel values of the warped color image 300 nearly match pixel values of the color image 210 of the target view. Accordingly, a difference between the pixel values may be close to zero. In this example, when the difference between the pixel values is less than or equal to the predetermined threshold value, the extraction unit 120 may determine the corresponding region is not the occlusion region.

Figure 4:
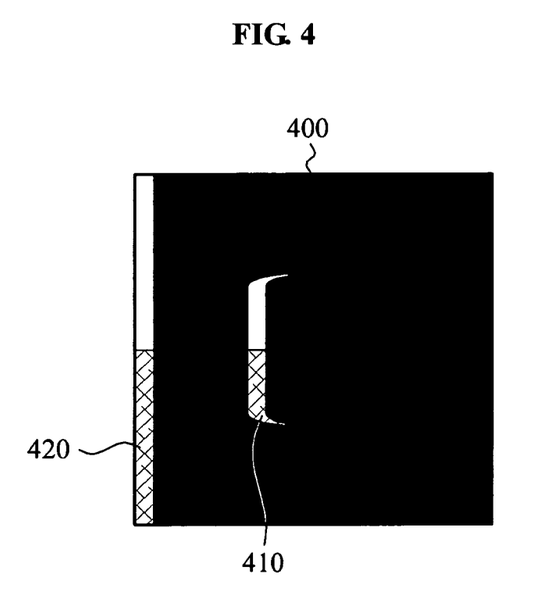
FIG. 4 illustrates a result of extracting, by the image processing apparatus of FIG. 1, an occlusion region from the warped color image of FIG. 3 according to example embodiments.

FIG. 4 illustrates a result 400 of extracting, by the image processing apparatus 100 of FIG. 1, an occlusion region from the warped color image 300 of FIG. 3 according to example embodiments.

Occlusion regions 410 and 420, in which the pixel values are present, may correspond to the occlusion regions 331 and 332 of FIG. 3.

According to example embodiments, the result 400 may be encoded together with the color image 220 of the reference view. According to other example embodiments, the backward warping unit 130 of the image processing apparatus 100 may backward warp the result 400 to be matched again with the reference view.

The backward warping corresponds to processing, which includes for example, shifting of the occlusion regions 410 and 420 included in the result 400 to be matched again with the reference view through a backward process of warping of the warping unit 110.

Figure 5:
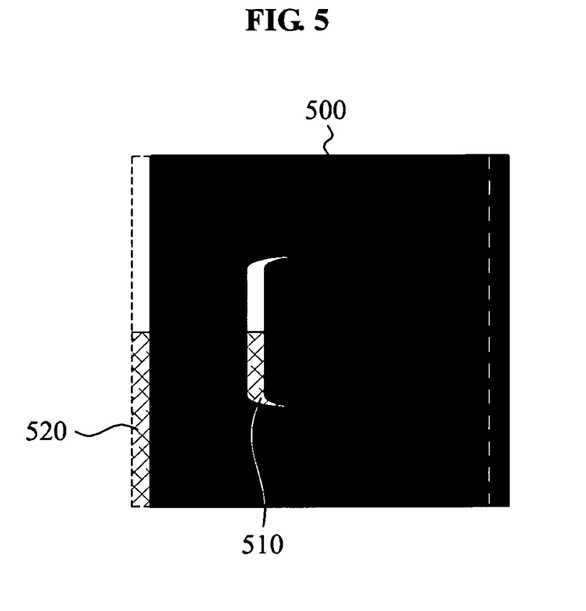
FIG. 5 illustrates a result image of the image processing apparatus of FIG. 1 backward warping the occlusion region of FIG. 4 to correspond to the color image of the reference view of FIG. 2 according to example embodiments.

FIG. 5 illustrates a result image 500, obtained when the image processing apparatus 100 of FIG. 1 performs backward warping of the occlusion regions 410 and 420 of FIG. 4 to correspond to the color image 220 of the reference view of FIG. 2, according to example embodiments.

Backward warped occlusion regions 510 and 520 correspond to the occlusion regions 410 and 420 of FIG. 4.

While the occlusion regions 410 and 420 are shifted left during the backward warping process, the occlusion region 420 may be positioned outside a border of a corresponding image. In this example, information of the occlusion region 420 may be lost. Therefore, the processing unit 140 of the image processing apparatus 100 may preserve the occlusion region 420 by applying a side offset to a left. For example, application of the side offset may be a coordinate movement.

Prior to the encoding of the occlusion region after the side offset is applied, the processing unit 140 may duplicate a color value from the color image 220 of the reference view with respect to a portion where the color value is absent.

Accordingly, a frequency of an edge portion of each of the occlusion regions 410 and 420 may decrease and thus, it is possible to prevent an amount of encoded data from increasing. In addition, an encoding process of the color image 220 of the reference view may be used and thus, an amount of data for the encoded occlusion region to be stored and to be transmitted may be decreased.

Figure 6:
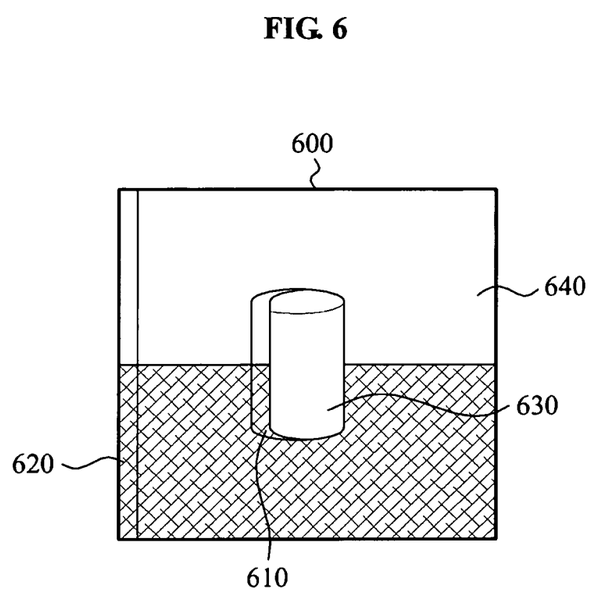
FIG. 6 illustrates a result image of the image processing apparatus of FIG. 1 processing the backward warped result image of FIG. 5 to preserve a side offset portion and to decrease an amount of data according to example embodiments.

FIG. 6 illustrates an occlusion region image 600 that is a result image of the image processing apparatus 100 of FIG. 1 processing the backward warped result image of FIG. 5 to preserve a side offset portion and to decrease an amount of data according to example embodiments.

Occlusion regions 610 and 620 correspond to a result of the processing unit 140 applying the side offset to the occlusion regions 510 and 520 of FIG. 5. Color values of remaining regions excluding the occlusion regions 610 and 620 are duplicated from the color image 220 of the reference view of FIG. 2.

Color values of a foreground region 630 and a background region 640 are filled from color values of the foreground region 221 and the background region 222 within the color image 220 of the reference view of FIG. 2.

With respect to a hole occurring due to image noise or other processing errors regardless of the above process, the occlusion region image 600 may be corrected by performing post-processing including hole filling or various filtering.

When encoding the color image 220 of the reference view and a depth image (not shown) of the reference view corresponding to the color image 220 using a multi-view plus depth (MVD) format and the like, the encoding unit 150 of the image processing apparatus 100 may encode the depth image in association with the occlusion region image 600.

Accordingly, instead of separately encoding the color image 210 of the target region and a depth image (not show) of the target region, the color image 210 of the target view may be rendered using data encoded with respect to the reference view.

Figure 7:
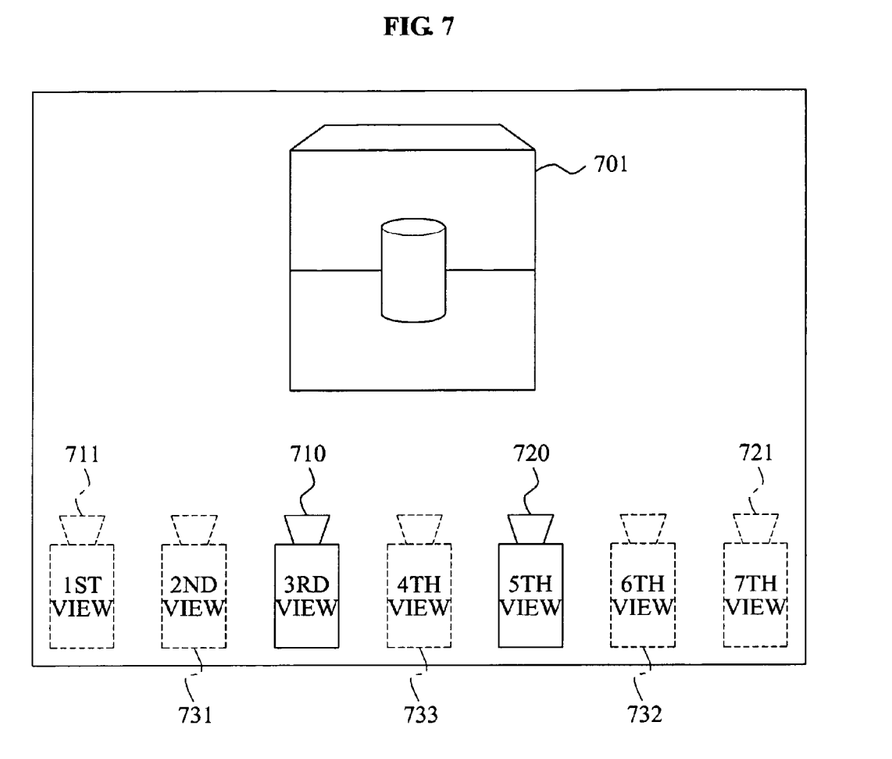
FIG. 7 illustrates a process of the image processing apparatus of FIG. 1 performing processing of a multi-view image according to example embodiments.

FIG. 7 illustrates a process of performing processing of a multi-view image, for example, using the image processing apparatus 100 of FIG. 1, according to example embodiments.

The present embodiment corresponds to a multi-view image or a multi-view video provided with seven different views. Using the image processing method described above with reference to FIG. 2 through FIG. 6, the occlusion region information may be extracted and encoded according to a view difference with a first target view 711, with respect to a first reference view 710, for example using the image processing apparatus 100.

A color image 701 or a depth image corresponding to the first target view 711 need not be separately stored or transmitted, but instead may be rendered using an encoded color image, depth image, and occlusion region image of the first reference view 710.

Rendering may be performed similarly with respect to a virtual view 731 between the first reference view 710 and the first target view 711.

Similarly, when the same scheme is applied between a second reference view 720 and a second target view 721, a color image of the second target view 721 may also be rendered even though actually encoded data is a color image, a depth image and an occlusion region image corresponding to the second reference view 720.

An image of a predetermined virtual view 732 between the second reference view 720 and the second target view 721 may also be rendered.

An image of a virtual view 733 between the first reference view 710 and the second reference view 720 may be rendered using a color interpolation according to a conventional scheme.

Accordingly, data encoded to store and transmit a 7-view image or video provided from the seven views of FIG. 7 may be data of the color image 701, the depth image, and the occlusion region image corresponding to each of the first reference view 710 that is a third view and the second reference view 720 that is a fifth view.

Accordingly, an amount of data to be encoded may be significantly decreased and overhead of image processing and image transmission may also be significantly decreased.

Figure 8:
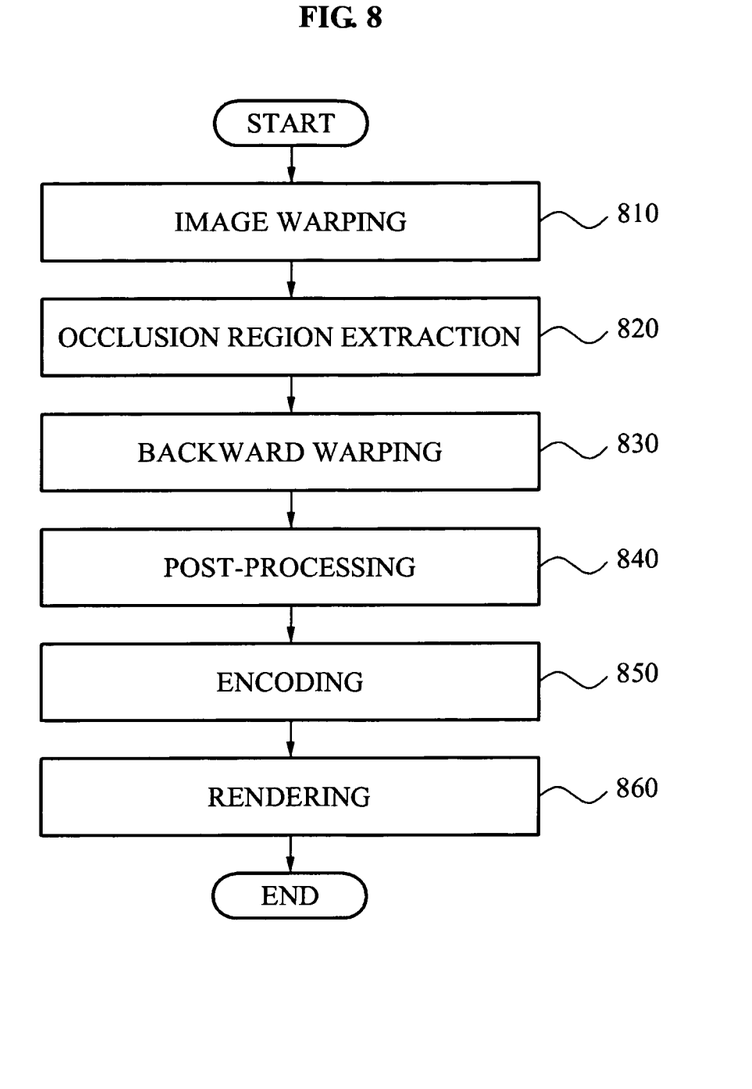
FIG. 8 illustrates an image processing method according to example embodiments.

FIG. 8 illustrates an image processing method according to example embodiments.

In operation 810, a reference view image may be warped to correspond to a target view image, for example, using the warping unit 110 of the image processing apparatus 100.

Warping of the reference view image is described above with reference to FIG. 2 and FIG. 3.

In operation 820, an occlusion region may be extracted using a color value difference and/or a depth value difference between a warped image and the target view image, for example using the extraction unit 120.

A process of extracting the occlusion region and a result thereof are described above with reference to FIG. 4.

In operation 830, the extracted occlusion region may be backward warped to correspond to the reference view image, for example using the backward warping unit 130. A backward warping process and a result thereof are described above with reference to FIG. 5.

In operation 840, an occlusion region image may be generated by applying a side offset to the backward warped occlusion region, by duplicating a pixel value from the reference view image with respect to a portion where the pixel value is absent, and by performing various post-processing, for example, by the processing unit 140.

Operation 840 will be further described with reference to FIG. 9.

In operation 850, the generated occlusion region image may be encoded together with the reference view image, for example, using the encoding unit 150.

In operation 860, a color image of the target view may be rendered using the encoded color image of the reference view and the encoded occlusion region information, for example, with the rendering unit 160.

The encoding process is described above with reference to FIG. 6 and FIG. 7.

Figure 9:
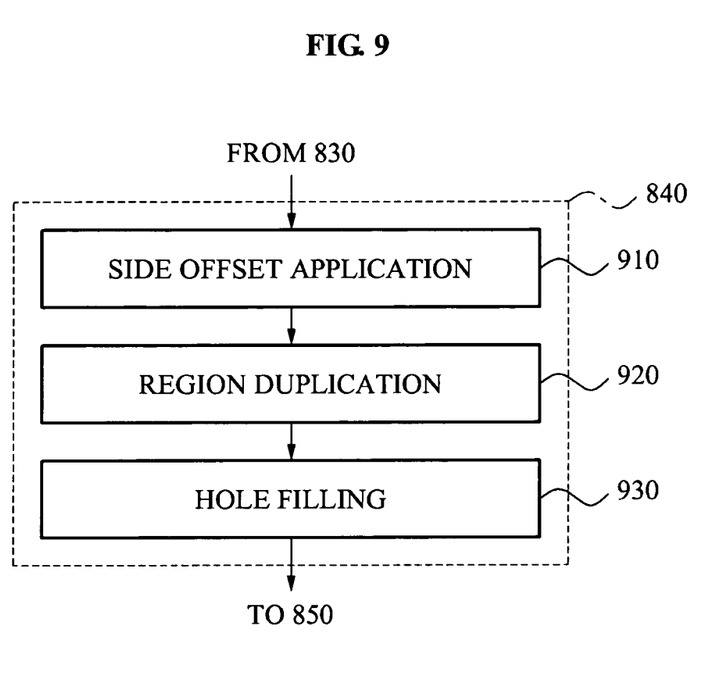
FIG. 9 illustrates a detailed operation of post-processing of the image processing method of FIG. 8.

FIG. 9 illustrates a detailed operation of operation 840 of the image processing method of FIG. 8.

In operation 910, the side offset may be applied to an appropriate direction so that information of an occlusion region portion outside a location of the reference view image in the occlusion region may not be lost, for example, using the processing unit 140 of the image processing apparatus 100. For example, the side offset may be applied through a coordinate movement.

In operation 920, a pixel value may be duplicated from an original view image with respect to a region where the pixel value is absent, excluding the occlusion region, for example, using the processing unit 140.

With respect to a hole occurring due to image noise or other processing errors regardless of the above process, the processing unit 140 may generate and correct an occlusion region image by performing post-processing including hole filling or various filtering in operation 930.

An operation of the processing unit 140 is described above with reference to FIG. 5 and FIG. 6.

The image processing method according to the above-described embodiments may be recorded in non-transitory computer-readable media or processor-readable media including program instructions to implement various operations embodied by a computer. The media may also include, alone or in combination with the program instructions, data files, data structures, and the like. The image processing methods described herein may be executed on a general purpose computer or processor or may be executed on a particular machine such as the image processing apparatus described herein.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a processor to control one or more processor-executable units;
   an extraction unit to extract an occlusion region of a color image of a reference view using a difference between a warped color image of the reference view corresponding to a target view and a color image of the target view;
   a backward warping unit to backward warp the occlusion region of the color image of the reference view to correspond to the reference view; and
   a processing unit to generate an occlusion region image to be stored by applying a side offset to the backward warped occlusion region of the color image of the reference view.

2. The image processing apparatus of claim 1, wherein the processing unit duplicates a color value from a corresponding pixel of the color image of the reference view with respect to a pixel where a color value within the occlusion region image is absent.

3. The image processing apparatus of claim 2, wherein the processing unit performs post-processing with respect to the occlusion region image, and the post-processing comprises hole filling.

4. The image processing apparatus of claim 1, further comprising: a warping unit to warp the color image, of the reference view to correspond to the target view, using at least one of a depth image of the reference view and a depth image of the target view.

5. The image processing apparatus of claim 1, further comprising: an encoding unit to encode the occlusion region image in association with the color image of the reference view.

6. An image processing apparatus, comprising:
   a processor to control one or more processor-executable units;
   an extraction unit to extract an occlusion region of a depth image of a reference view using a difference between a warped depth image of the reference view corresponding to a target view and a depth image of the target view;
   a backward warping unit to backward warp the occlusion region of the depth image of the reference view to correspond to the reference view; and
   a processing unit to generate an occlusion region image to be stored by applying a side offset to the backward warped occlusion region of the depth image of the reference view.

7. The image processing apparatus of claim 6, wherein the processing unit duplicates a depth value from a corresponding pixel of the depth image of the reference view with respect to a pixel where a depth value within the occlusion region image is absent.

8. The image processing apparatus of claim 6, further comprising: an encoding unit to encode the occlusion region image in association with the depth image of the reference view.

9. An image processing method, comprising:
   extracting an occlusion region of a color image of a reference view using a difference between a warped color image of the reference view corresponding to a target view and a color image of the target view;
   backward warping the occlusion region of the color image of the reference view to correspond to the reference view; and
   generating, by way of a processor, an occlusion region image by applying a side offset to the backward warped occlusion region of the color image of the reference view.

10. The image processing method of claim 9, wherein the generating comprises: applying the side offset to the backward warped occlusion region of the color image of the reference view; and duplicating a color value from a corresponding pixel of the color image of the reference view with respect to a pixel where a color value within the occlusion region image is absent.

11. The image processing method of claim 10, wherein the generating further comprises: performing post-processing with respect to the occlusion region image, the post-processing comprising hole filling.

12. The image processing method of claim 9, further comprising: prior to the extracting, warping the color image of the reference view to correspond to the target view, using at least one of a depth image of the reference view and a depth image of the target view.

13. The image processing method of claim 9, further comprising:
   encoding the occlusion region image in association with the color image of the reference view.

14. An image processing method, comprising:
   extracting an occlusion region of a depth image of a reference view using a difference between a warped depth image of the reference view corresponding to a target view and a depth image of the target view;
   backward warping the occlusion region of the depth image of the reference view to correspond to the reference view; and
   generating, by way of a processor, an occlusion region image by applying a side offset to the backward warped occlusion region of the depth image of the reference view.

15. The image processing method of claim 14, wherein the generating comprises: applying the side offset to the backward warped occlusion region of the depth image of the reference view; and duplicating a depth value from a corresponding pixel of the depth image of the reference view with respect to a pixel where a depth value within the occlusion region image is absent.

16. The image processing method of claim 14, further comprising:
   encoding the occlusion region image in association with the depth image of the reference view.

17. A non-transitory computer-readable medium comprising a program for instructing a computer to perform an image processing method, comprising:
   extracting an occlusion region of a color image of a reference view using a difference between a warped color image of the reference view corresponding to a target view and a color image of the target view;

backward warping the occlusion region of the color image of the reference view to correspond to the reference view; and generating an occlusion region image by applying a side offset to the backward warped occlusion region of the color image of the reference view.

18. An image processing method, comprising:

extracting an occlusion region of a color image of a reference view using a difference between a color image of a target view and a warped color image of the reference view corresponding to the target view;

backward warping the occlusion region of the color image of the reference view to correspond to the reference view;

generating an occlusion region image by applying a side offset to the backward warped occlusion region of the color image of the reference view; and encoding, by way of a processor, data including the occlusion region image.

19. An image processing apparatus, comprising:

a processor to control one or more processor-executable units;

an extraction unit to extract an occlusion region of a color image of a reference view using a difference between a color image of a target view and a warped color image of the reference view corresponding to the target view;

a backward warping unit to backward warp the occlusion region of the color image of the reference view to correspond to the reference view;

a processing unit to generate an occlusion region image by applying a side offset to the backward warped occlusion region of the color image of the reference view; and an encoding unit to encode data including the occlusion region image.

20. The image processing apparatus of claim 19, wherein the encoding of the data by the encoding unit includes encoding the extracted occlusion region information and the color image of the reference view without encoding the color image of the target view.

* * * * *

UNITED STATES PATENT AND TRADEMARK OFFICE
CERTIFICATE OF CORRECTION

PATENT NO. : 8,781,252 B2  
APPLICATION NO. : 13/064921  
DATED : July 15, 2014  
INVENTOR(S) : Seok Lee et al.

Page 1 of 1

It is certified that error appears in the above-identified patent and that said Letters Patent is hereby corrected as shown below:

In the Claims

Column 9, Line 41, In Claim 4, delete "image," and insert -- image --, therefor.

Signed and Sealed this  
Fourth Day of November, 2014

Michelle K. Lee  
*Deputy Director of the United States Patent and Trademark Office*